Sept. 30, 1952 M. E. AMDURSKY ET AL 2,612,614

CATHODE-RAY TUBE FOR COLOR TELEVISION SYSTEMS

Filed Jan. 18, 1951

INVENTORS
MARK E. AMDURSKY
THEODORE S. NOSKOWICZ
BY Francis W. Crotty
THEIR ATTORNEY Patented Sept. 30, 1952 2,612,614

UNITED STATES PATENT OFFICE 2,612,614

CATHODE-RAY TUBE FOR COLOR TELEVISION SYSTEMS

Mark E. Amdursky, Chicago, and Theodore S. Noskowicz, Wooddale, Ill., assignors to The Rauland Corporation, a corporation of Illinois Application January 18, 1951, Serial No. 206,608

5 Claims. (Cl. 313—92)

Figure 1:
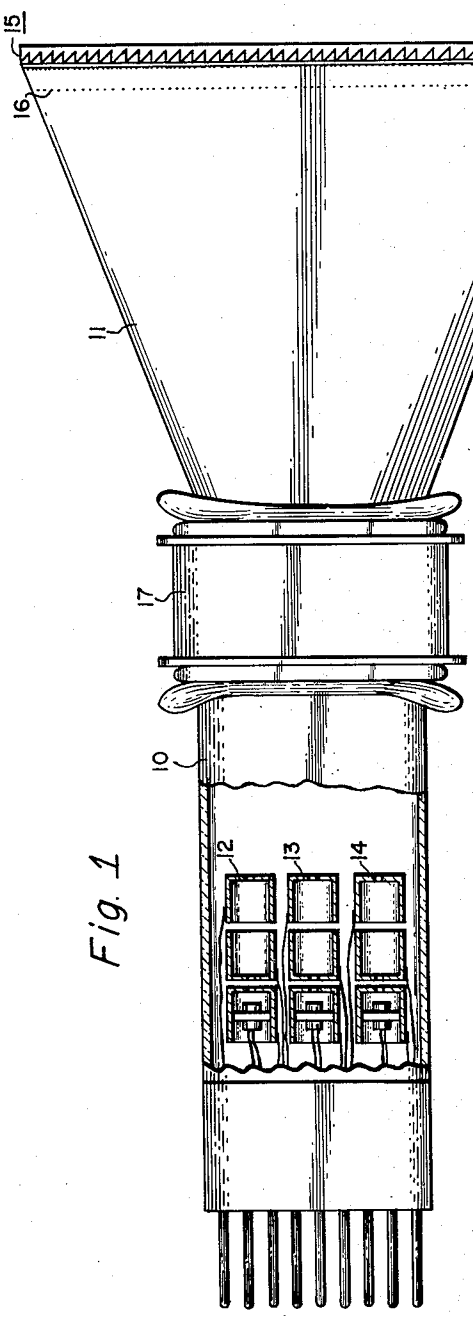

This invention relates to cathode-ray tubes for use in color television systems, and more particularly to an improved optical system for a cathode-ray tube for the reproduction of polychromatic images.

Color television systems have been proposed in which the transmission of video information occurs in a repeating sequence of color fields, each field in the sequence representing the color content of one of the primary colors contained in the televised image. Such systems are usually referred to as the "field-sequential" type. The sequence of color fields is repeated at a rate sufficiently great that when the individual color images are reproduced in a color television receiver the persistence of vision of the human eye gives an observer the sensation of an image in natural color. Color image reproduction of this type may be accomplished by a cathode-ray tube in which one, or more cathode-ray beams are controlled to strike sequentially, and in synchronism with the reception of the various color fields, selected portions of a fluorescent screen each portion of which emits a light corresponding to one of the primary colors. A variety of such cathode-ray image-reproducing tubes are known to the art.

One tube construction comprises a target electrode having a plurality of fluorescent strips adjacent one another and constructed to fluoresce in various colors corresponding to the primary colors of the system. For example, where the video information occurs in a repeating sequence of color fields corresponding respectively to the red, blue and green color components of the televised image, the fluorescent strips of the target electrode are arranged in groups, each group containing three strips selected to fluoresce respectively in red, blue and green. The tube also includes deflecting means for directing the cathode-ray beam thereof sequentially to the various color strips in synchronism with the reception of the corresponding color fields of the received television signal. Alternately, the tube may include a plurality of electron guns for developing three separate cathode-ray beams directed respectively to the red, blue and green fluorescent strips in each group, the beams being rendered effective in synchronism with the corresponding color information of the received signal.

This reproducing device, however, is difficult to construct with the techniques employed in the present-day manufacture of cathode-ray tubes. The various fluorescent strips must be extremely narrow to give to the eye of an observer the impression of continuity between the various colors. But, when the strips are sufficiently narrow for continuity, the problem of color registration is aggravated. That is, during the reception of a particular color field of the television signal it is necessary that the cathode-ray beam be directed solely to the fluorescent strips which emit light corresponding to that color, and any impingement by the beam on the other strips causes color distortion or contamination. Obviously, the possibility of such contamination increases as the strips are made more narrow.

Another type of reproducing device that has been proposed for use in field sequential color television systems comprises a target electrode having a monochrome fluorescent screen similar to that used in black and white television systems. A plurality of color selective transmission-type transparent light filters are arranged in groups similar to the grouping of the fluorescent strips of the target electrode of the reproducing device described above. A disadvantage in the use of transmission light filters lies in the fact that the colors translated thereby are substantially attenuated, resulting in a material decrease in intensity of the reproduced color image as compared with the intensity of the image actually reproduced on the fluorescent screen.

In accordance with the present invention, the target structure of a color television tube comprises a fluorescent screen similar to that used in cathode-ray tubes for black and white image reproduction and which emits light including a plurality of color components upon impingement by a cathode-ray beam. A plurality of inclined color-selective reflectors are mounted adjacent the screen to reflect the light emitted thereby, upon such impingment by the cathode-ray beam, in a series of differently-colored light paths. These light paths correspond to the various primary colors and the reflectors are arranged in a repeating sequence across the screen for sequential scansion by the cathode-ray beam or beams in accordance with the sequentially received color fields of a color television signal. Further reflectors or mirrors may also be provided facing the color-selective reflectors, but which do not have a color selective characteristic, and these further reflectors act to reflect the colored light paths and direct them to the eye of an observer.

Due to the fact that color-selective reflectors can be constructed to have an extremely minute thickness, negligible attenuation occurs to the light reflected thereby as compared with the light losses that arise when the aforementioned transmission-type filters are used. Moreover, since the fluorescent screen of the cathode-ray tube of this invention may be composed of a single fluorescent substance, the problem of color registration and contamination is not as critical as is the case when the screen is composed of a plurality of strips of fluorescent substance having different color characteristics.

It is, accordingly, an object of this invention to provide a new and improved optical system for a cathode-ray tube to enable it to reproduce polychromatic images.

A further object of the invention is to provide an improved optical system for a cathode-ray tube to enable such a tube to reproduce a televised image in natural color, this being accomplished with greatly decreased color attenuation as compared with tubes using color-selective transparent filters.

Yet another object of this invention is to provide an improved optical system for a cathode-ray tube which operates efficiently to enable the tube to reproduce a televised image in natural color with high color brightness, yet which uses a standard monochrome fluorescent screen.

The optical system is to be shown and described herein as associated with a cathode-ray image-reproducing device for use in a color television receiver. However, it is to be understood and it will be apparent as the description proceeds that the structure may similarly be used in conjunction with the camera tube in a color television transmitter.

Figures 2, 3:
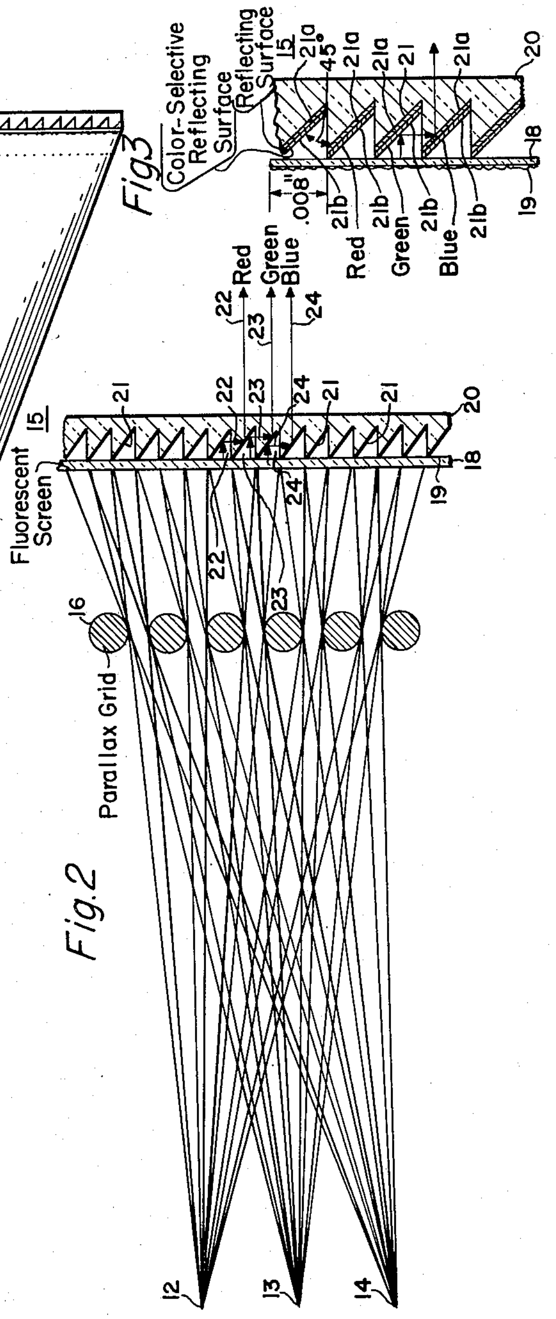

The features of this invention which are believed to be new are set forth with particularity in the appended claims. The invention itself, however, together with further objects and advantages thereof may best be understood by reference to the following description when taken in conjunction with the accompanying drawings, in which:

Figure 1 shows a cathode-ray image-reproducing device incorporating the target electrode of this invention, Figure 2 is a schematic diagram illustrating an operating principle of the reproducing device of Figure 1, and, Figure 3 indicates a section of the target electrode of the invention on a greatly enlarged scale.

Referring now to the drawings, the cathode-ray image-reproducing device illustrated therein comprises a neck portion 10 and an enlarged or conical portion 11. Neck portion 10 is shown partly in section to reveal a plurality of electron guns 12, 13 and 14 which are mounted at one end thereof. The electron guns, which may be of any well-known construction, develop a plurality of distinct electron beams within the device and direct the beams to a target electrode and optical system 15 constructed in accordance with the invention and situated at the end of the enlarged portion remote from the electron guns. A parallax grid structure 16 is situated adjacent electrode 15 and is so constructed that the electron beams of electron guns 12, 13 and 14 impinge on different selected portions of the electrode (in a manner to be described), as these beams are scanned thereover by means of a well-known deflection yoke 17 or other suitable deflection arrangement mounted on the neck portion of the device.

The action of the electron beams within the reproducing device, and the configuration of target electrode and optical system 15, are more clearly shown in Figures 2 and 3. Electrode 15 comprises a transparent supporting member 18 having a coating 19 of fluorescent material affixed to one face thereon over which the electron beams are scanned. Fluorescent screen 19 may have any well-known composition to emit light containing color components necessary for color reproduction upon impingement by the electron beams. System 15 includes another transparent member 20 which may constitute the face plate of the tube, this member being serrated to present to screen 19 a series of faces 21 which are inclined to the plane of the screen preferably at an angle of 45°. A highly polished reflecting surface or mirror 21*a* is applied directly over each inclined surface to reflect all light that may reach the mirror. The mirrors 21*a* are not color selective per se, but a color-selective reflector 21*b* is superposed over each mirror. In a three component color system, certain of the color selective reflectors respond to green light, others to red and still others to blue light, and they are arranged to represent a repeating color sequence. Thus, the serrated section of member 20 may comprise a series of reflectors responsive to red light, a second series of reflectors responsive to green light and a third series of reflectors responsive to blue light, these series being interlaced with one another to present a repeating color pattern.

The color-selective reflectors 21*b* are arranged to face the fluorescent screen 19, and reflect the light emitted thereby upon impingement by the cathode-ray beams in a series of discretely-colored light paths directed parallel to the plane of the screen. The mirrors 21*a* are arranged to face the color-selective reflectors, and act to reflect the colored paths perpendicular to and away from the screen to the eye of an observer.

The parallax grid 16 comprises a series of parallel and equispaced bars defining a raster which extends parallel to the color-selective reflectors 21*b*. The cross-sectional dimension of each grid rod, and the spacing of the raster from screen 19, are chosen with respect to the positions of the electron guns 12, 13 and 14 to permit the beam issuing from any one gun to impinge solely upon those parts of the screen which correspond to the projected areas of a given series of the color-selective reflectors upon the screen. For example, the beam from gun 12 as projected through the grid bars may, at any position in its scanning process, strike a part of screen 19 facing one of the red-selective reflectors 21*b*, while the beams from guns 13 and 14 are able to excite only portions of the screen facing respectively the blue- and green-selective reflectors 21*b*.

When any elemental portion of the screen is excited by the beam from any of the guns 12, 13 and 14 it emits light having red, blue and green color components. However, the light originating from a given elemental screen area falls upon the color-selective reflector facing that area and only that component of light to which the particular reflector responds is translated further. As shown in Figure 3, light from a portion of the screen may fall on a green-selective reflector 21*b* which reflects the green component of the incident light along a path parallel to screen 19. The green component then strikes a non-selective mirror 21*a* on the back of a reflector 21*b* and is again reflected 90° and is thus directed to the observer. In the same way, red and blue color components of the light from screen 19 are translated along individual paths, each including a color-selective reflector and a non-selective mirror to the observer. These discretely-colored light paths are shown (for example) by the paths 22, 23 and 24 of Figure 2. If the beams from the guns 12, 13 and 14 are modulated in well-known fashion in accordance with the several color fields of the televised image, as these beams are scanned across screen 19 the observer receives a sensation of image reproduction in actual color.

The rods comprising grid structure 16 may extend in a vertical direction, and in this case the inclined faces 21 of transparent member 20 are constructed in the form of vertically extending strips. It is, of course, within the concept of the invention that the grid rods extend in a horizontal direction, in which case the inclined faces 21 would take the form of horizontally extending strips. Moreover, grid structure 16 may take the form of a mesh or screen, in which case the faces 21 would each comprise a series of elemental color selective reflecting areas, and would be arranged in a repeating sequence to reflect colors corresponding to the primary colors. The last-mentioned embodiment of grid 16 and faces 21 finds utility in a dot-sequential type of color system.

The optical system of the invention may be constructed in the following manner: Transparent member 20 may comprise a molded piece of transparent material which, as previously mentioned, may conveniently form the face-plate for the reproducing device and which has its inner surface serrated with the inclined faces 21. The inclination of the inclined faces is preferably 45° to the plane of screen 19, and the projection of each face on this plane may be of the order of .008 inch. The non-selective reflectors or mirrors 21*a* are deposited on the inclined faces 21, and are arranged to reflect light incident thereon from the back of these faces. Each of the mirrors 21*a* may take the form of a thin metallic film which is deposited on faces 21 by spraying or evaporation, as is well known. A suitable black pigment is then sprayed over the metallic film to form an opaque coating. A further film of metal is then deposited over the pigment and transparent member 20 is then sealed to the end of cone 11 of the cathode-ray tube. The further metallic film is evaporated through the parallax grid structure 16 by evaporating sources situated at the precise points of the various guns 12, 13 and 14, to form the color-selective reflectors 21b. For example, the metallic films facing gun 12 are evaporated to form red-selective reflectors, the films corresponding to gun 13 are evaporated to form green-selective reflectors, and those corresponding to gun 14 are evaporated to form blue-selective reflectors. The process by which metallic films may be evaporated to form color-selective reflectors is described in an article by G. L. Dimmic in the Journal of the Society of Motion Picture Engineers, January 1942, pages 36–44. The thickness of the color selective reflectors is extremely minute and the light paths suffer very little attenuation in the reflecting process, as compared with the attenuation of these paths upon transmission by transparent-type color-selective filters.

Cone 11 of the reproducing device is provided with slots adjacent the face plate, so that the thin transparent member 18 upon which fluorescent coating 19 is affixed may be inserted into the tube adjacent the face plate. After the transparent plate has been so inserted, its edges and the slots in the cone may be sealed to form a unitary structure with face plate 20.

The invention provides, therefore, a cathode-ray tube which incorporates an optical system so constructed that the tube is capable of reproducing televised images in full color. The target electrode of the invention utilizes a single fluorescent screen yet produces images having a high degree of color brightness, this being due to the negligible amount of light attenuation in the reflecting system.

It is apparent that the optical system of this invention may be utilized in cathode-ray tubes other than the particular type described herein. For example, the system may be constructed to form an attachment for existing cathode-ray tubes to convert such tubes for color reproduction, it being merely necessary that some deflection means be provided for the tube to allow sequential scansion of the various color selective reflectors.

While a particular embodiment of the invention has been shown and described, modifications may be made and it is intended in the appended claims to cover all such modifications as fall within the true spirit and scope of the invention.

We claim:

1. In a cathode-ray device for reproducing polychromatic images and including a fluorescent screen responsive to electron bombardment to emit light including a plurality of color components, an optical system comprising: a series of color-selective reflecting elements positioned adjacent said screen individually facing an elemental area thereof and inclined relative to the plane of said screen for producing a repeating series of discretely-colored light paths; and a corresponding series of further reflecting elements respectively facing said color-selective reflecting elements for directing said light paths in a preselected direction relative to the plane of said screen.

2. In a cathode-ray device for reproducing polychromatic images and including a fluorescent screen responsive to electron bombardment to emit light including a plurality of color components, an optical system comprising: a series of surfaces mounted adjacent said screen and inclined to the plane thereof; a series of color-selective reflecting elements fixed to said surfaces and individually facing an elemental area of said screen for producing a repeating series of discretely-colored light paths; and a series of further reflecting elements fixed to said surfaces and respectively facing said color-selective reflecting elements for directing said light paths in a preselected direction relative to the plane of said screen.

3. In a cathode-ray device for reproducing polychromatic images and including a fluorescent screen responsive to electron bombardment to emit light including three primary color components, an optical system comprising: a series of color-selective reflecting elements positioned adjacent said screen individually facing an elemental area thereof and inclined relative to the plane of said screen for producing a repeating series of three discretely-colored light paths corresponding to said primary colors; and a series of further reflecting elements respectively facing said color-selective reflecting elements for directing said light paths in a preselected direction relative to the plane of said screen.

4. In a cathode-ray device for reproducing polychromatic images and including a fluorescent screen responsive to electron bombardment to emit light including a plurality of color components, an optical system comprising: a member of transparent material positioned adjacent and parallel to said screen, said member being serrated to present a series of surfaces to said screen inclined to the plane thereof; a series of color-selective reflecting elements fixed to said surfaces and individually facing an elemental area of said screen for producing a repeating series of discretely-colored light paths; and a series of further reflecting elements fixed to said surfaces and respectively facing said color-selective reflecting elements for directing said light paths in a preselected direction relative to the plane of said screen.

5. In a cathode-ray device for reproducing polychromatic images and including a fluorescent screen responsive to electron bombardment to emit light including a plurality of color components, an optical system comprising: a member of transparent material positioned adjacent and parallel to said screen, said member being serrated to present a series of surfaces to said screen inclined to the plane thereof by an angle of substantially 45°; a series of color-selective reflecting elements fixed to said surfaces and individually facing an elemental area of said screen for producing a repeating series of discretely-colored light paths directed parallel to said screen; and a series of further reflecting elements fixed to said surfaces and respectively facing said color-selective reflecting elements for directing said light paths in a direction perpendicular to and away from said screen.

MARK E. AMDURSKY.
THEODORE S. NOSKOWICZ.

REFERENCES CITED

The following references are of record in the file of this patent:

UNITED STATES PATENTS

| Number | Name | Date |
|---|---|---|
| 2,200,285 | Lorenzen | May 14, 1940 |
| 2,296,908 | Crosby | Sept. 29, 1942 |
| 2,446,440 | Swedlund | Aug. 3, 1948 |
| 2,461,515 | Bronwell | Feb. 15, 1949 |
| 2,518,200 | Sziklai | Aug. 8, 1950 |
| 2,543,477 | Sziklai | Feb. 27, 1951 |